(12) United States Patent
Suciu et al.

(10) Patent No.: US 9,726,112 B2
(45) Date of Patent: Aug. 8, 2017

(54) REVERSE FLOW GAS TURBINE ENGINE AIRFLOW BYPASS

(71) Applicant: United Technologies Corporation, Hartford, CT (US)

(72) Inventors: Gabriel L. Suciu, Glastonbury, CT (US); Brian D. Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 525 days.

(21) Appl. No.: 14/190,144

(22) Filed: Feb. 26, 2014

(65) Prior Publication Data

US 2014/0250862 A1    Sep. 11, 2014

Related U.S. Application Data

(60) Provisional application No. 61/773,908, filed on Mar. 7, 2013.

(51) Int. Cl.
*F02K 3/06* (2006.01)

(52) U.S. Cl.
CPC ............ *F02K 3/06* (2013.01); *F05D 2210/40* (2013.01); *F05D 2250/314* (2013.01); *Y02T 50/671* (2013.01)

(58) Field of Classification Search
CPC ... F02K 3/06; F02K 3/02; F02K 3/075; F02K 3/077; F02K 3/12; F02K 3/105; F05D 2210/40
USPC ........ 60/226.1, 226.3, 262, 39.15, 791, 792, 60/224
See application file for complete search history.

(56) References Cited

U.S. PATENT DOCUMENTS

| | | | | |
|---|---|---|---|---|
| 3,589,132 A | * | 6/1971 | Du Pont | F02K 3/105 60/262 |
| 4,141,212 A | * | 2/1979 | Koschier | F02C 3/145 60/39.511 |
| 4,285,194 A | * | 8/1981 | Nash | F02K 1/822 60/262 |
| 5,943,856 A | | 8/1999 | Lillibridge et al. | |
| 7,140,174 B2 | * | 11/2006 | Johnson | F02C 7/042 60/226.1 |
| 7,770,377 B2 | * | 8/2010 | Rolt | F02K 3/06 60/226.1 |
| 7,837,436 B2 | * | 11/2010 | Corsmeier | F02K 3/075 415/1 |
| 7,870,741 B2 | * | 1/2011 | Corsmeier | F02C 9/18 60/226.1 |
| 7,934,901 B2 | * | 5/2011 | Moniz | F01D 5/066 415/115 |
| 8,051,639 B2 | | 11/2011 | Lair | |
| 8,104,261 B2 | | 1/2012 | Marshall et al. | |
| 8,109,466 B2 | | 2/2012 | Aten et al. | |
| 8,151,551 B2 | | 4/2012 | Pero | |
| 8,172,175 B2 | | 5/2012 | Lair | |

(Continued)

FOREIGN PATENT DOCUMENTS

GB    2445083 A  *  6/2008  ............. F01D 5/066

*Primary Examiner* — Jason L Vaughan
(74) *Attorney, Agent, or Firm* — Kinney & Lange, P.A.

(57) ABSTRACT

A gas turbine engine has a propulsor including a fan and a power turbine, an engine core aerodynamically connected to the propulsor by a transition duct, and a bypass valve in the transition duct that allows for air from the engine core to bypass the power turbine.

16 Claims, 2 Drawing Sheets

(56) References Cited

U.S. PATENT DOCUMENTS

| | | | |
|---|---|---|---|
| 8,176,725 B2 | 5/2012 | Norris et al. | |
| 8,276,362 B2 | 10/2012 | Suciu et al. | |
| 8,336,289 B2* | 12/2012 | Roberge | F02C 3/113 60/263 |
| 8,516,789 B2* | 8/2013 | Kupratis | F02K 3/065 60/226.1 |
| 8,726,633 B2* | 5/2014 | Roberge | F02C 3/113 60/226.1 |
| 8,955,304 B2* | 2/2015 | Suciu | F02K 3/06 60/224 |
| 9,140,212 B2* | 9/2015 | Moon | F02K 3/025 |
| 9,239,004 B2* | 1/2016 | Kupratis | F02C 6/02 |
| 2006/0185346 A1* | 8/2006 | Rolt | F02K 3/06 60/224 |
| 2009/0056309 A1* | 3/2009 | Roberge | F02C 3/113 60/263 |
| 2009/0126341 A1 | 5/2009 | Lair | |
| 2010/0034639 A1* | 2/2010 | Moniz | F01D 5/066 415/115 |
| 2010/0037623 A1* | 2/2010 | Jewess | F02C 3/05 60/770 |
| 2011/0056208 A1* | 3/2011 | Norris | F02C 3/107 60/772 |
| 2013/0025286 A1 | 1/2013 | Kupratis | |
| 2013/0205747 A1* | 8/2013 | Suciu | F02K 3/06 60/39.15 |
| 2013/0205752 A1* | 8/2013 | Suciu | F02K 3/025 60/226.1 |
| 2013/0255224 A1* | 10/2013 | Kupratis | F02C 6/02 60/226.1 |
| 2014/0252160 A1* | 9/2014 | Suciu | B64D 27/12 244/55 |
| 2015/0121896 A1* | 5/2015 | Suciu | F02K 1/605 60/796 |
| 2015/0300293 A1* | 10/2015 | Suciu | F02C 3/045 60/772 |
| 2015/0322855 A1* | 11/2015 | Kupratis | F01D 1/04 60/805 |
| 2015/0345384 A1* | 12/2015 | Kupratis | F02C 6/02 60/726 |
| 2015/0354449 A1* | 12/2015 | Suciu | F02K 1/60 60/805 |
| 2015/0369134 A1* | 12/2015 | Kupratis | F02C 3/04 60/208 |
| 2016/0003144 A1* | 1/2016 | Kupratis | F01D 13/003 60/771 |
| 2016/0017844 A1* | 1/2016 | Suciu | F02K 1/60 244/53 B |
| 2016/0102634 A1* | 4/2016 | Suciu | F01D 13/003 60/262 |

* cited by examiner

REVERSE FLOW GAS TURBINE ENGINE AIRFLOW BYPASS

CROSS-REFERENCE TO RELATED APPLICATION(S)

This application claims priority from U.S. Provisional Application No. 61/773,908, filed Mar. 7, 2013, for "REVERSE FLOW GAS TURBINE ENGINE AIRFLOW BYPASS".

BACKGROUND

This application relates generally to a gas turbine engine for an aircraft, and more specifically, to a reverse flow gas turbine engine that contains an airflow bypass.

Jets and aircraft powered by gas turbine engines typically have small auxiliary engines at the back end, often referred to as auxiliary power units (APUs). These engines often have no fan, and are considered low pressure ratio devices. The APU provides ground power to operate cabin systems, such as the environmental control system (including air conditioning) and powering the electronics of the aircraft cabin, as well as provide start-up potential for the flight engines. APUs currently are parasitic hardware, i.e., the unit is used on the ground, but it is seldom used in flight. Thus, most APUs are considered waste weight on an aircraft. Typical APUs may generate enough ground power, but flight engine cores are also actuated often on the ground. APUs typically turn off automatically when flight engine cores are activated.

With the cores getting smaller in large pressure ratio geared turbofan engines, the core size for a single isle jet or aircraft is similar to the prior art APU. Elimination of the APU from an aircraft is desired to save weight, and thus fuel burn which is in direct proportion to the weight of a jet or aircraft.

SUMMARY

In one embodiment, a gas turbine engine has a propulsor including a fan and a power turbine, an engine core aerodynamically connected to the propulsor by a transition duct, and a bypass valve in the transition duct that allows air from the engine core to bypass the power turbine.

In another embodiment, an aircraft has an aircraft body and an engine attached to the aircraft body. The engine includes a propulsor having a fan and a power turbine, an engine core aerodynamically connected to the propulsor by a transition duct, and an airflow bypass in the transition duct that allows for the airflow from the engine core to bypass the power turbine.

In yet another embodiment, a gas turbine engine has a propulsor, a gas generator aerodynamically connected to the propulsor by a transition duct, and an airflow bypass in the transition duct that allows for the venting of airflow from the engine core to bypass the propulsor.

DETAILED DESCRIPTION

The present application relates to reverse core gas turbine engines. The reverse core engine contains a bypass valve in the transition duct between the propulsor and engine core. The valve may be activated during ground operation to bypass the power turbine and allow the engine to operate without using the power turbine and propulsion fan.

Figure 1:
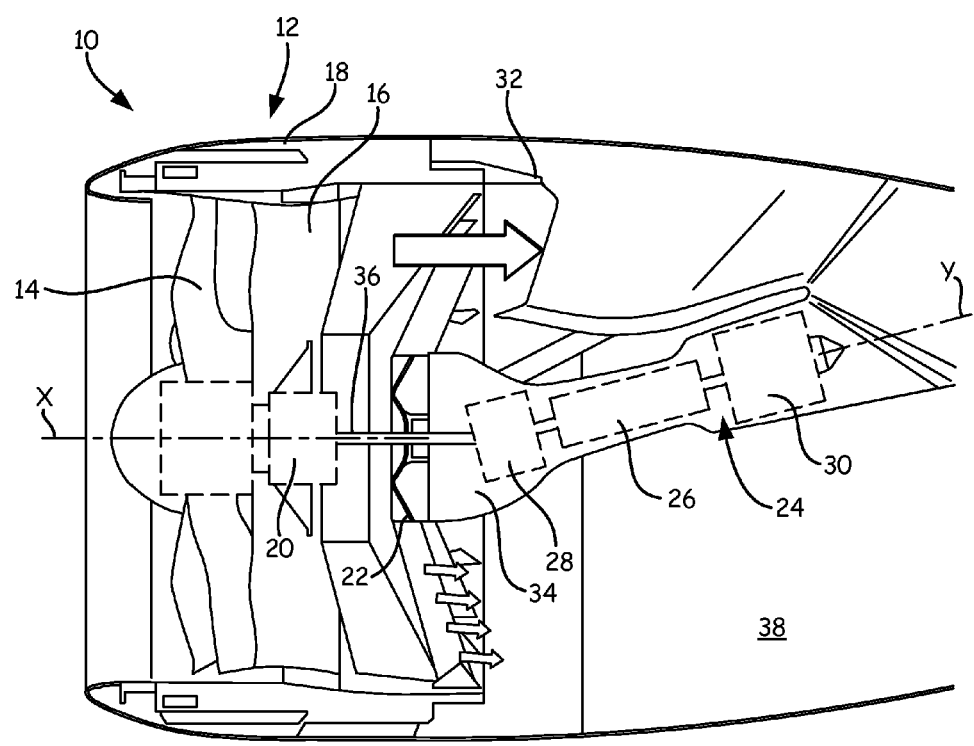
FIG. 1 is a schematic view of a reverse core engine.

FIG. 1 is a schematic view of a reverse core engine. Engine 10 includes a propulsor 12 at a forward end which is centered for rotation about an axis X. Propulsor 12 includes a fan 14 and a nozzle 16 rearward thereof surrounded by a nacelle 18. Axis X is also a central axis of the fan and the nozzle. Engine 10 may include a gear reduction 20 driven by a power turbine section 22 to drive the fan 14.

A core engine 24 includes combustion section 26 positioned between a turbine section 28 and a compressor section 30. The core engine 24 may also be referred to as the gas generator of the turbine engine. Air from nacelle 18 passes into an inlet duct 32 to be delivered to the compressor 30. The duct 32 is over a limited circumferential extent within nacelle 18. At other circumferential locations within nacelle 18, air flows as bypass air for propulsion. The air is compressed and delivered into combustion section 26, where it mixes with fuel and is ignited. Products of this combustion pass through turbine section 28, which drives compressor section 30. The products of combustion then pass through a transition duct 34 over power turbine section 22, to drive the fan 14 that is connected by thereto by a propulsor shaft 36. Air then exits the power turbine 22 and is exhausted therefrom, such as by having a nozzle that directs the flow aftward upon leaving the power turbine 22.

The illustrated gas turbine engine is a "reverse flow engine" in that the compressor 30 is positioned further into (forward to aft) the engine than is the turbine 28. That is, the turbine section 28 is closest to the propulsor 12, the combustor section 26 and the compressor section 30 are positioned further away in the downstream or aft direction of the propulsor 12 relative to the turbine section 28.

The engine 10 is positioned such that the fan 12, the gear 20, and the power turbine 22 are positioned centered on the axis X, while the core engine 24, including the compressor section 30, the combustor section 26, and the turbine section 28, is positioned on a non-parallel axis Y. The core engine 24 may be mounted in some manner to the nozzle 16, such as through transition duct 34.

In an engine that is reverse flow, and in particular in one wherein the axes X and Y are not parallel, a relatively long core engine 24 can be achieved without the core engine blocking the exit area 38. However, the overall length of the engine 10 is reduced as the core engine 24 is mounted at an angle with respect to the propulsor 12.

Figure 2:
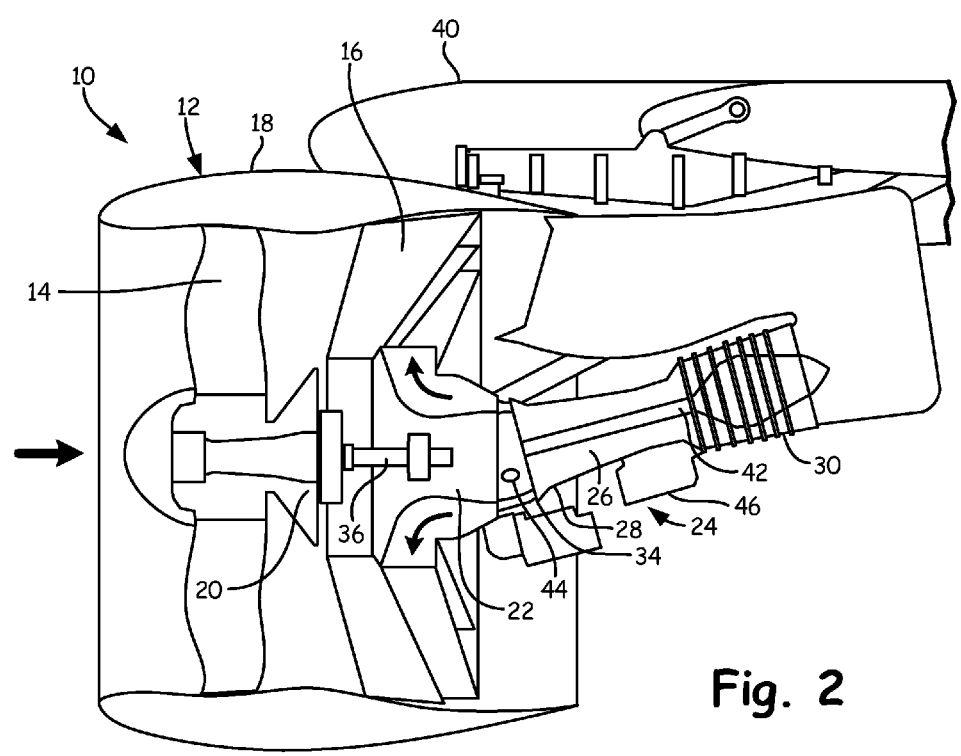
FIG. 2 is a cross sectional view of an engine mounted to an aircraft wing.

FIG. 2 is a cross sectional view of the engine 10 mounted to an aircraft wing 40. Many of the same elements as shown in FIG. 1 are also illustrated in FIG. 2: the engine 10 with the propulsor 12 having the fan 14 and the nozzle 16 surrounded by the nacelle 18, and the core engine 24 with the combustor section 26, the turbine section 28, and the compressor section 30 aligned along core engine shaft 42. The inlet duct 32 extends from the propulsor 12 to the compressor section 30 of the core engine 24. The transition duct 34 aerodynamically connects the turbine section 28 of the core engine 24 with the power turbine 22.

During normal operation, gases and airflow leaving the turbine section 28 will flow through the transition duct 34 into the power turbine 22, which will turn the propulsor shaft 36. The gear reduction 20 will change the speed of the propulsor shaft 36 as delivered to the fan 14 so that the fan 14 will run at a different speed than that of the power turbine 22. Typically, the gears are sized to slow the speed of the fan 14.

The transition duct 34 may contain a flow bypass 44. The flow bypass 44 will allow pressurized air from the turbine section 28 to leave the transition duct 34 prior to the power turbine 22. That is, the flow bypass 44 disrupts the aerodynamic connection between the turbine section 28 of the core engine 24 with the power turbine 22 of the propulsor 12. Thus, the fan 14 will not run when the flow bypass 44 is open to allow venting of the airflow.

In one embodiment, the flow bypass 44 is a valve, such as a butterfly valve. The valve is controlled from the cockpit of the aircraft. In one embodiment, the valve may be designed so that any forward motion of the aircraft will automatically trigger the close of the flow bypass 44. When opened, the pressurized air will flow through the flow bypass 44 as the path of least resistance, and thus not drive the power turbine 22. Although disclosed as a single valve, it is envisioned that multiple valve may be circumferentially placed about the transition duct 34. Similarly, any type of controllable valve may be used, including but not limited to ball, gate, globe, pin, angled or straight flow, and the like.

Hardware 46 may be attached to the core engine 24. The hardware will provide the functions that are typical of an auxiliary power unit (APU), such as providing airflow for the environmental control system, and generating power for the aircraft electronics. The system described eliminates the need for a separate APU on the aircraft. This results in great weight savings, and thus produces a more efficient aircraft as the weight of an aircraft is directly proportional to the fuel burn of an engine. Also, the system is more efficient due to the high pressure ratio of the core engine due to its design for flight.

The flow bypass 44 may be activated during ground operation to bypass the power turbine 22 and allow the engine 10 to operate without using the power turbine 22 and the propulsor 12. Thus, the engine 10 may operate as an APU during ground operation. This removes the requirement for an additional, separate engine to act as the APU on the aircraft.

Discussion of Possible Embodiments.

The following are non-exclusive descriptions of possible embodiments of the present invention.

A gas turbine engine has a propulsor including a fan and a power turbine, an engine core aerodynamically connected to the propulsor by a transition duct; and a bypass valve in the transition duct that allows for air from the engine core to bypass the power turbine.

The gas turbine engine of the preceding paragraph can optionally include, additionally and/or alternatively, any one or more of the following features, configurations and/or additional components:

the engine core includes a compressor section, a combustor section, and a turbine section, with the turbine section being closer to the propulsor than the compressor section;

the propulsor delivers air into the compressor section through a flow inlet duct;

the engine core is attached to the transition duct and flow inlet duct;

the propulsor has a first axis and the engine core has a second axis;

the first axis and second axis are not parallel;

the power turbine is positioned downstream of the turbine section of the engine core; and further comprising a gear reduction between the power turbine and the fan of the propulsor to cause the fan to rotate at a slower speed than the power turbine;

the power turbine rotates on the first axis; and/or the bypass valve is a butterfly valve.

In another embodiment, an aircraft has an aircraft body and an engine attached to the aircraft body. The engine includes a propulsor having a fan and a power turbine, an engine core aerodynamically connected to the propulsor by a transition duct, and an airflow bypass in the transition duct that allows airflow from the engine core to bypass the power turbine.

The aircraft of the preceding paragraph can optionally include, additionally and/or alternatively, any one or more of the following features, configurations and/or additional components:

the engine core includes a compressor section, a combustor section, and a turbine section, with the turbine section being closer to the propulsor than the compressor section;

the propulsor delivers air into the compressor section through a flow inlet duct;

the engine core is attached to the transition duct and flow inlet duct;

the propulsor has a first axis and the engine core has a second axis;

the first axis and second axis are not parallel;

the power turbine is positioned downstream of the turbine section of the engine core; and further comprising a gear reduction between the power turbine and the fan of the propulsor to cause the fan to rotate at a slower speed than the power turbine;

the power turbine rotates on the first axis;

the airflow bypass is a valve; and/or the valve is a butterfly valve.

In yet another embodiment, a gas turbine engine has a propulsor, a gas generator aerodynamically connected to the propulsor by a transition duct, and an airflow bypass in the transition duct that allows for the venting of airflow from the engine core to bypass the propulsor.

Although the present invention has been described with reference to preferred embodiments, workers skilled in the art will recognize that changes may be made in form and detail without departing from the spirit and scope of the invention.

The invention claimed is:

1. A gas turbine engine comprising:
    a propulsor including a fan and a power turbine, wherein the propulsor has a first axis;
    an engine core disposed downstream of the propulsor and having a second axis, wherein the engine core is aerodynamically connected to the propulsor by a transition duct, and the engine core comprises a compressor section, a combustor section, and a turbine section, with the turbine section being closer to the propulsor than the compressor section;
    a flow inlet duct disposed downstream of the propulsor, wherein the flow inlet duct receives air at a location downstream of the propulsor and delivers air into the compressor section; and
    a bypass valve in the transition duct that allows for air from the engine core to bypass the power turbine.

2. The gas turbine engine of claim 1, wherein the propulsor delivers air into the compressor section through the flow inlet duct.

3. The gas turbine engine of claim 1, wherein the engine core is attached to the transition duct and flow inlet duct.

4. The gas turbine engine of claim 1, wherein the first axis and second axis are not parallel.

5. The gas turbine engine of claim 4, wherein the power turbine is positioned downstream of the turbine section of the engine core; and further comprising:

a gear reduction between the power turbine and the fan of the propulsor to cause the fan to rotate at a slower speed than the power turbine.

6. The gas turbine engine of claim 5, wherein the power turbine rotates on the first axis.

7. The gas turbine engine of claim 1, wherein the bypass valve is a butterfly valve.

8. An aircraft comprising:
an aircraft body;
an engine attached to the aircraft body including:
   a propulsor having a fan and a power turbine;
   an engine core disposed downstream of the propulsor, wherein the engine core is aerodynamically connected to the propulsor by a transition duct, and the engine core comprises a compressor section, a combustor section, and a turbine section, with the turbine section being closer to the propulsor than the compressor section;
   a flow inlet duct disposed downstream of the propulsor, wherein the flow inlet duct receives air at a location downstream of the propulsor and delivers air into the compressor section; and
   an airflow bypass in the transition duct that allows for airflow from the engine core to bypass the power turbine.

9. The aircraft of claim 8, wherein the engine core is attached to the transition duct and flow inlet duct.

10. The aircraft of claim 8, wherein the propulsor has a first axis and the engine core has a second axis.

11. The aircraft of claim 10, wherein the first axis and second axis are not parallel.

12. The aircraft of claim 11, wherein the power turbine is positioned downstream of the turbine section of the engine core; and further comprising:
   a gear reduction between the power turbine and the fan of the propulsor to cause the fan to rotate at a slower speed than the power turbine.

13. The aircraft of claim 12, wherein the power turbine rotates on the first axis.

14. The aircraft of claim 8, wherein the airflow bypass is a valve.

15. The aircraft of claim 14 wherein the valve is a butterfly valve.

16. A gas turbine engine comprising:
a propulsor;
a gas generator aerodynamically connected to the propulsor by a transition duct;
a flow inlet duct disposed downstream of the propulsor, wherein the flow inlet duct receives air at a location downstream of the propulsor and delivers the air to the gas generator; and
an airflow bypass in the transition duct that allows for the venting of airflow from the engine core to bypass the propulsor.

* * * * *